United States Patent Office

2,824,132

α-METHYL METHIONINE AND SALTS THEREOF

Alexander R. Matzuk, Colonia, Karl Pfister III, Westfield, and Edward F. Rogers, Middletown, N. J., assignors to Merck & Co., Inc., Rahway, N. J., a corporation of New Jersey No Drawing. Application August 3, 1954
Serial No. 447,656

3 Claims. (Cl. 260—534)

This invention relates to amino acids. More particularly, this invention is concerned with the production of the novel α-methyl derivative of methionine. This compound has interesting and useful properties as a methionine antagonist and has activity against harmful agents such as Newcastle disease virus. This invention is also concerned with novel processes of producing α-methyl methionine and intermediate compounds useful in such processes.

According to the present invention it has been discovered that by reacting methyl mercaptan with methyl vinyl ketone there is produced methyl thiobutane-3-one (I) which may be reacted with an alkali metal cyanide in the presence of ammonia and carbon dioxide to form 5-(β-methylmercapto) ethyl-5-methyl hydantoin (II) and the later compound hydrolyzed to produce α-methyl methionine (III). This process may be represented as follows:

CH₃SH + CH₂=CHCOCH₃ ⟶ CH₃SCH₂CH₂COCH₃

I

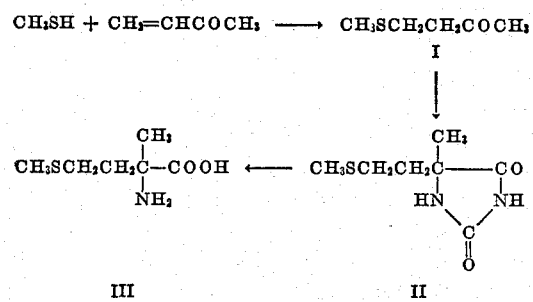

III        II

Methyl thiobutane-3-one is conveniently prepared in the first step of this process by intimately contacting methyl mercaptan and methyl vinyl ketone under solvent conditions. An inert solvent may be used if desired although it is not essential since the reactants are liquid at ordinary temperatures and accordingly may function as the reaction medium. Ordinarily temperatures may be used to effect the reaction but it is preferred to employ slightly elevated temperatures such as about 35–50° C. to complete the reaction more quickly. After the reaction is completed the desired product may be recovered from the reaction mixture by conventional methods.

In the next and second step of this process 5-(β-methylmercapto) ethyl-5-methyl hydantoin is prepared by reacting methyl thiobutane-3-one with an alkali metal cyanide in the presence of ammonia and carbon dioxide. This reaction is conveniently effected by contacting the reactants in the presence of an aqueous organic solvent such as a lower alcohol like ethanol or methanol. The ammonia and carbon dioxide may be conveniently added in the form of solid ammonium carbonate if desired. Elevated temperatures of about 40–70° C. are usually used to effect the reaction and bring it to completion in a minimum of time. Following completion of the reaction the mixture is filtered, acidified and reduced to a small volume. The precipitate of 5-(β-methylmercapto) ethyl-5-methyl hydantoin may then be recovered and purified by extraction with ethanol, concentrated and crystallized from ether.

The 5-(β-methylmercapto) ethyl-5-methyl hydantoin may be hydrolyzed with either an acid or base, preferably at a slightly elevated temperature such as the reflux temperature, to produce α-methyl methionine. This hydrolysis however is most conveniently effected by reacting the hydantoin in aqueous solution with a strong base such as an alkali metal or alkaline earth metal hydroxide, for example, sodium hydroxide, potassium hydroxide, barium hydroxide and the like. After the hydrolysis is completed the product is readily recovered by acidifying the resulting solution and concentrating the acidified solution. If desired, the α-methyl methionine can be purified by recrystallization from aqueous alcohol to obtain the compound in substantially pure form.

Various salts of α-methyl methionine such as the alkali metal and alkaline earth metal salts and acid addition salts thereof may be conveniently produced, if desired, by reacting α-methyl methionine with the appropriate acid or base. Examples of salts prepared in this manner are the sodium, potassium, calcium, hydrochloride and sulfate salts of α-methyl methionine.

The following examples are added to illustrate specific embodiments of the invention but it is understood the invention is not to be limited to these specific reactions.

EXAMPLE 1

Methyl thiobutane-3-one

A mixture of 26.2 g. of dry methyl vinyl ketone, .2 g. of cupric acetate and 0.2 g. of hydroquinone was placed in a 3-neck round-bottom flask equipped with inlet tube, stirrer, condenser and thermometer. An exit line was arranged to pass through a solution of lead acetate. Liquid methyl mercaptan (40 ml.) was placed in a small round-bottom flask connected to the inlet tube. The methyl mercaptan was heated with warm water, vaporizing it, and forcing it through the inlet tube which extended below the surface of the reaction mixture. The temperature of the reaction was maintained at 35–40° C. with cooling. After complete addition stirring was continued overnight at room temperature. The reaction mixture was then filtered and distilled in vacuo. The methylthiobutane-3-one boiled at 75°/14 mm., $n_D^{25}$ 1.4772. The yield was 33.8 g. (77%).

EXAMPLE 2

5-(β-methylmercapto) ethyl-5-methyl hydantoin

A mixture of 33.8 g. of methylthiobutan-3-one and 28.6 g. of potassium cyanide was dissolved in an alcohol-water mixture to form a homogeneous solution. Then 132.2 g. of ammonium carbonate monohydrate was added. The reaction mixture was heated eighteen hours at 58–60° C. and placed in an open dish and heated four hours longer on a steam bath. The solution was acidified to Congo red paper and evaporated to a small volume, charcoaled, filtered and cooled. The crystalline precipitate was filtered and extracted with ethanol. The ethanol extract was evaporated to yield a syrup which was dissolved in ether, filtered, treated with petroleum ether, and cooled. The crystalline 5-(β-methylmercapto) ethyl-5-methyl hydantoin obtained weighed 40.8 (82%), M. P. 105–107° C. A sample for analysis was recrystallized from ether-petroleum ether and melted at 109–110° C.

Analysis.—Calcd.: N, 14.89. Found: N, 14.92.

EXAMPLE 3

α-Methyl methionine

Forty and three tenths g. of 5-(β-methyl-mercapto) ethyl-5-methyl hydantoin, 217.4 g. of barium hydroxide octahydrate and 150 ml. of water were heated under reflux until evolution of ammonia ceased. Carbon dioxide was then passed into the solution until no further precipitation occurred. After acidifying the solution it was filtered and concentrated to dryness. The residue was dissolved in hot water, a small amount of insoluble material being rejected. On cooling α-methyl methionine crystallized; M. P. 280° C. (dec.). The filtrate yielded additional material, M. P. 279° C. (dec.). The combined yield was 15.8 gms. (45%). A sample for analysis was obtained by recrystallization from aqueous alcohol; M. P. 283–4° C. (dec.).

*Analysis.*—Calcd.: C, 44.15; H, 8.03; N, 8.58. Found: C, 44.58; H, 7.89; N, 8.60.

What is claimed is:

1. A compound from the group consisting of α-methyl methionine, mineral acid salts of α-methyl methionine, alkali metal salts of α-methyl methionine, and alkaline earth metal salts of α-methyl methionine.
2. α-Methyl methionine.
3. Sodium α-methyl methionine.

References Cited in the file of this patent

UNITED STATES PATENTS

| | | |
|---|---|---|
| 2,225,384 | Graenacher et al. | Dec. 17, 1940 |
| 2,327,890 | Henze | Aug. 24, 1943 |
| 2,366,221 | Spurlock | Jan. 2, 1945 |
| 2,404,509 | Long | July 23, 1946 |
| 2,557,913 | Livak et al. | June 19, 1951 |
| 2,557,920 | White | June 19, 1951 |

OTHER REFERENCES

Cahen: Chem. Abstracts, vol. 41, col. 4581–2 (1947).

Brown et al.: Proc. Soc. Expt. Biol. & Med., vol. 77 (May–Aug. 1951), p. 367.

Izumiya: Chem. Abstracts, vol. 46, col. 7048 (1952.)